March 24, 1931.

A. J. CARDOZA

TEMPORARY BINDER

Re. 18,009

Original Filed Oct. 31, 1927

INVENTOR.
Antone J. Cardoza
BY
Wm. S. Graham
ATTORNEY

Reissued Mar. 24, 1931 Re. 18,009

UNITED STATES PATENT OFFICE

ANTONE J. CARDOZA, OF OAKLAND, CALIFORNIA

TEMPORARY BINDER

Original No. 1,683,238, dated September 4, 1928, Serial No. 229,922, filed October 31, 1927. Application for reissue filed May 10, 1930. Serial No. 451,447.

This invention relates to temporary binders of the type adapted to hold magazines, catalogues, telephone books, or other publications of the type having one edge bound, or consisting of a fold, the said publication being removably held in position within the binder.

I am aware of binders which hold such publications therein by means of manually operated spring rods, and others wherein the publication is locked within the binder by a locking means which is a visible and conspicuous part of the binder, and still others wherein the locking feature is finger operated by anyone having the binder in his possession.

My invention has features and advantages not possessed by any of the foregoing types, and is especially adapted for observation and Pullman cars, clubs, libraries, and other places where it frequently happens that the publications are of very considerable value, and experience has demonstrated that patrons frequently remove the magazine from the binder, such, for instance, as on observation cars of railroad trains. The carrier provides expensive pictorial magazines of views along the line of travel, and experience has shown that the traveling public remove the magazines and appropriate the same. To place a visible lock upon the binder gives affront to refined patronage, yet, for the financial benefit of the owner and the benefit of all the patrons, it is desirable that the magazine be locked within the binder for use by all.

The object of the invention is to produce a temporary binder economical in commercial production, and which is positive and secure in its holding of the publication within the binder and which is adaptable to operation by a socket wrench or socket key locking and unlocking a mechanism which normally is not operable without use of a socket wrench or key.

Another object is to provide a binder adapted to lock the bound publication into a grooved channel, so that it may not readily be removed therefrom without a specially adapted means for unlocking the binder, and generally to improve upon the present existing temporary binders for similar purposes.

Other objects of the invention will be more fully understood by reference to the following detailed specification, and the accompanying drawing, it being understood that variations in form, size, proportion and minor details, within the scope of the appended claims may be made without departing from the spirit of the invention.

Referring to the drawing, wherein like numerals denote corresponding parts throughout the several views:—

Figure 2:
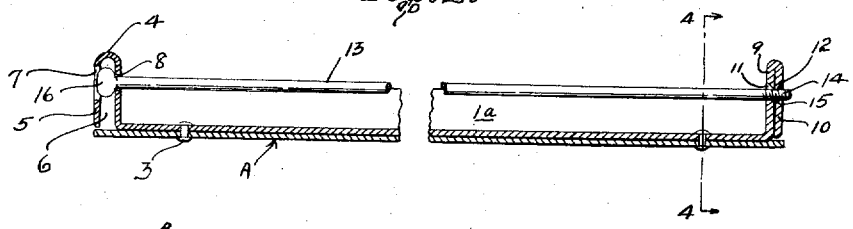
Fig. 2 is a broken sectional view, taken centrally of the longitudinal dimension.
Figure 3:
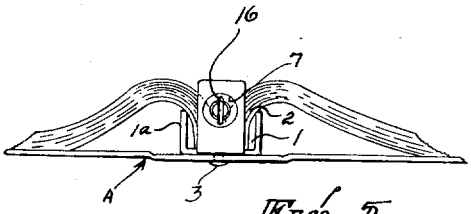
Fig. 3 is a vertical elevation of an end view showing the locking means inset.
Figure 4:
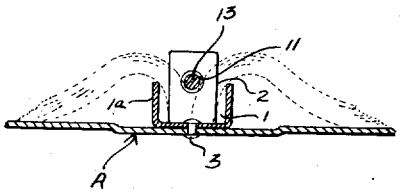
Fig. 4 is a cross section taken transversely on line 4—4, Fig. 2.

A binding device in accordance with this invention comprises, in connection with two cover boards joined together with the usual hinge back portion generally indicated A, a longitudinal support plate which may take the form of a U-shaped channel member 1 extending longitudinally of said back portion A, and adapted to receive the bound or folded portion of a magazine or catalogue, or folded edge of a publication as at 2, said channel member 1 having any suitable means therein for removably and tightly attaching same to the back A of the cover, such as indicated 3 in Fig. 2, said member 1 stopping short of the longitudinal limits of the back A so as to allow the locking means, hereafter described, to come within said limits and not project therebeyond. The member 1, when used for relatively thin publications, has longitudinal side flanges 1*a* extending upwardly from the floor thereof a sufficient distance to prevent the publication therein being spread quite flat, but permitting the publication to be opened sufficiently for use. It is therefore obvious that when the publication is of sufficient thickness so that its bulk prevents it from being slipped from under the bar 13, the flanges 1*a* may be eliminated.

Figure 5:
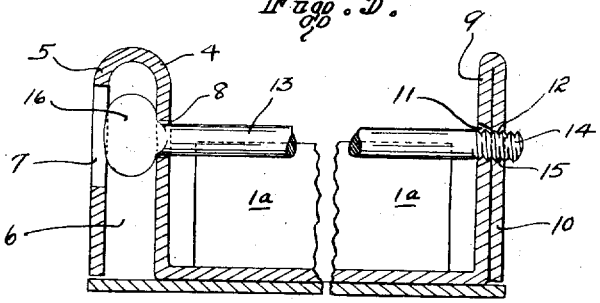
Fig. 5 is a cross section enlargement of the opposite ends of Fig. 2.

At one end of said channel member is a lug 4 extending upwardly from the bottom of the U channel member 1, and is preferably formed by being bent back downwardly upon itself substantially parallel as at 5, the two faces thus formed being in spaced relationship, as at 6. The end 4 is provided in its outer wall with an opening 7, and the inner wall of said lug is provided with an opening 8 the outer opening 7 being of greater diameter than the inner opening 8 and in substantial axial alignment therewith. At the opposite end of the U-channel member 1 is a second lug 9 extending upwardly, and being bent back downwardly upon itself substantially parallel, as at 10, it being optional whether the facing walls 9 and 10 are in contact or in spaced relationship, my preference being that the opposing faces thereof be substantially in contact. The inner upwardly turned wall of lug 9 preferably contains a guide opening 11 in alignment with a secondary opening 12 in the downwardly turned portion 10, the opening 12 having screw threads therein. This construction is probably best illustrated in Fig. 5.

A binder rod 13 is provided, preferably circular in transverse cross section, being of sufficient length to extend between and connect with the lugs 4 and 10, and being of less diameter than the openings 7, 8 and 11, and being threaded at one end as at 14 for threadably engaging the opening 12, which is provided with corresponding threads 15 for that purpose. The end of the rod 13 opposite the threaded end is headed as at 16 so that the headed portion is larger than the opening 8, and smaller than the opening 7, said headed portion 16 forming a shoulder in contact with the surface of lug 4 to restrict further forward movement of the rod 13 when the threaded end of said rod is drawn tightly into the threaded opening 12, said headed portion of the rod 13 also allowing for engagement therewith of a detached socket key 17, which key may be of any suitable type having a shank adapted to pass through the opening 7 and turnably engage the end 16 of the rod 13.

Figure 1:
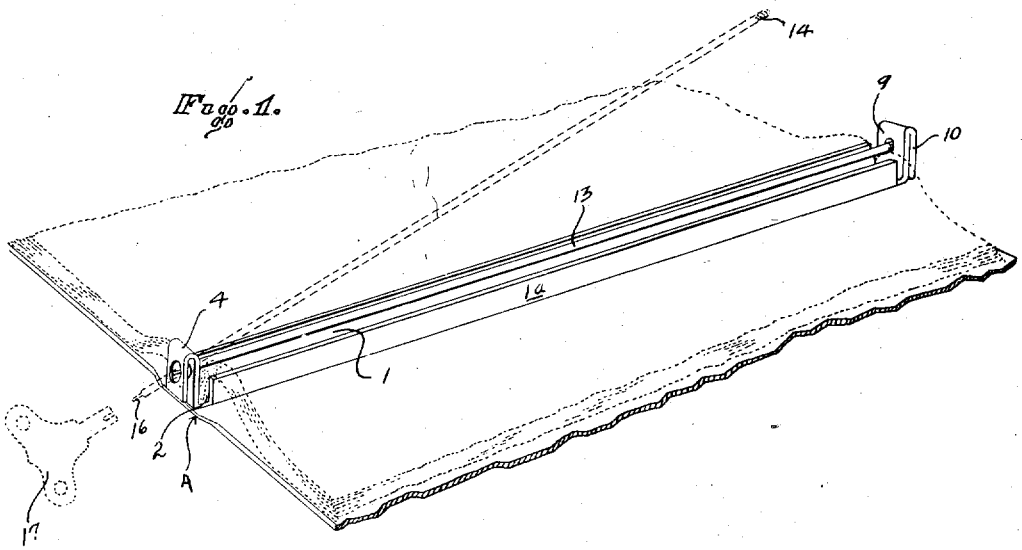
Fig. 1 is a perspective view of the binder showing in dotted lines a magazine therein, and also in dotted lines the binder rod partially removed from its locking position.

In operation, the rod 13 is unscrewed by means of the key 17 so that its opposite end 14 is disengaged from its threaded engagement with the lug 10, and the rod 13 may then be withdrawn, as shown in dotted lines Fig. 1, which permits of placing the fold of the magazine or other publication within the binder, by placing the bound edge or fold thereof in the channel member 1, the flange 4 and 9 preventing endwise slippage; the rod 13 is then passed between the pages of the magazine or book and inserted through the guide 9 and turned by means of key 17 into threaded engagement with opening 12 until the shoulder formed by the head 16 of the rod 13 impinges the lug 4. The key 17 is then removed and the magazine or book is left securely locked in the binder. While my preferred form shows the flanges 4 and 9 constructed by being bent back upon themselves, it is manifest that these lugs could be made of a single solid piece of material, having proper recesses at 7 and 11.

It is obvious that when the bound edge of the publication is placed within the channel 1 and the rod 13 is pressed down so as to be threaded through the guide 11 and fixedly engaged, the publication cannot be spread out flat and taken from the binder without removal of the rod 13. Since it is contemplated that a socket wrench or key of the special type to fit the rod head 16 will be in the possession of the custodian only of the publication, the publication is reasonably secure from being removed from the binder, since the head 16 of the rod 13 becomes recessed in the space 6 and not susceptible to finger operation. This construction eliminates the offensive appearance of locking the publication to prevent its removal.

Having thus described my invention what I claim and desire to secure by Letters Patent is:—

1. A binder device, comprising a longitudinal channel member adapted to receive the fold of a publication, an upwardly extending perforated lug at each end of said channel member, one of said lugs being adapted to tightly and removably engage an end of a binder rod, a binder rod extending through openings in both of said lugs and adapted to be removably engaged thereby in such manner that the fold of the publication is held by said rod within the channel member, said rod having one end adapted to releasable tight engagement in the opening in one lug and having an end headed so as to tightly impinge against a countersunk portion of one of said lugs when the tightly engageable end of the rod is tightly held by the first mentioned lug.

2. A binder device comprising a longitudinal channel member adapted to receive the fold of a publication, a rod substantially parallel therewith and adapted to hold a publication within said channel member by said rod being passed between the pages of said publication, lugs at the opposite ends of said channel member adapted for tightly and removably holding said rod in a fixed position, and means at one end of said rod adapted for engagement with a key whereby said rod may be released from said fixed position, said latter means lying within one of the lugs when the rod is tightly held.

3. A binder device comprising a longitudinal channel member to receive the fold of a publication, a lug at each end of said member, a rod having a headed end and a threaded end and extending between said lugs, the threaded end of said rod adapted for releasable engagement by one of said lugs, the other end of said rod passing through axially aligned bores of different diameters in the other lug in such manner that the headed end of said rod will be held within the recess of said lug and against the shoulder formed between the two bores.

4. A binder device comprising a longitudinal channel member adapted to receive the fold of a publication, an upwardly extending lug at each end of said member, a rod extending longitudinally of said member and substantially centrally disposed over the channel thereof, an end of said rod having threaded engagement with one of said lugs and having an end headed for shouldered engagement with one of said lugs, one of the said lugs being recessed to accommodate the headed portion of said rod, and said headed end of said rod being adapted to seat tightly within said recess when the threadedly engaged end of said rod is tightly engaged.

5. A binder device comprising a longitudinal channel member adapted to receive the fold of a publication, upwardly extending lugs at each of the opposite ends of said member, a rod extending longitudinally of said member, one end of said rod having a threaded engagement with one of said lugs and the other end of said rod being headed for shouldered engagement with the second of said lugs, the said second lug being recessed to accommodate the headed portion of said rod, and means to engage said headed portion of said rod within said recess so that said rod may be turned on its longitudinal axis.

6. A binder device comprising a longitudinal channel member having upwardly extending lugs at each of the opposite ends thereof, each of said upwardly extended lugs being formed by bending an extension of the floor of said channel member upwardly at an angle to said floor and then bending said extended portion back upon itself, the one of said lugs having a guide opening through its inner layer and being threaded in its outer layer, and the second of said lugs having its inner layer and outer layer in spaced relationship, the outer layer having an opening therethrough of greater diameter than a similar opening through the inner layer, a rod having a headed portion and a body portion and adapted to pass its body portion through the outer and inner layer of said second lug and having its headed portion adapted to pass through the outer layer and seat upon the inner layer, said rod having its opposite end threaded to engage the threaded portion in the outer layer of the first mentioned lug, the recessed headed end of said rod being adapted for engagement by a socket key for rotation of the rod so that the threaded end of said rod may be turned to threadably and tightly engage the first mentioned lug, the headed portion of said rod being then adapted to seat tightly against the inner wall of the second lug.

7. A device for temporary binders, comprising a pair of spaced lugs adapted to tightly and releasably engage a binder rod, means whereby said lugs may be supported in spaced relationship, one of said lugs provided with an opening therein adapted to receive a rod member, and one of said lugs having a recessed opening therethrough, and a headed rod adapted to connect and be tightly and releasably engaged by said lugs so that the head of the rod lies within said recess.

8. A device for temporary binders, comprising a pair of spaced lugs adapted to tightly and releasably engage a binder rod, means whereby said lugs may be supported in spaced relationship, one of said lugs provided with an opening therein adapted to receive a rod member, and one of said lugs having a recessed opening therethrough, and a rod adapted to connect and be engaged by said lugs, said rod having a headed end portion adapted to lie substantially within the recess of said opening.

9. A device for temporary binders, comprising a pair of spaced lugs adapted to tightly and releasably engage a binder rod, means whereby said lugs may be supported in spaced relationship, one of said lugs provided with an opening therein adapted to receive a rod member, and one of said lugs having a recessed opening therethrough, and a rod adapted to connect and be engaged by said lugs, said rod having a headed end portion adapted to lie substantially within the recess of said opening, said rod being adapted to be engaged by a key engagement at an end thereof.

10. A device for temporary binders, comprising a pair of lugs adapted to tightly and releasably engage a binder rod, each having an opening therein, means whereby said lugs may be supported in spaced relationship, a rod connecting said lugs and received and engaged by the lugs so that the end portions of the rod lie substantially within the extreme faces of the respective lugs, the rod having an end formed to receive a key whereby the rod may be manipulated.

11. A binder device comprising a unitary binder rod having a shoulder at an end portion thereof and having an end adapted to engagement by a key, a lug at each end of the binder rod, each of said lugs provided with an opening to receive an end of the binder rod, the opening in one of said lugs being recessed to receive therein the end of the rod having a shoulder, said lugs having a portion angularly extending therefrom in substantially parallel relation to the binder rod.

In testimony whereof I have signed my name to this specification.

ANTONE J. CARDOZA.